United States Patent [19]

Foran, Jr.

[11] Patent Number: 5,027,653

[45] Date of Patent: Jul. 2, 1991

[54] FLOWMETERS HAVING ROTORS WITH GROOVED BORES AND LANDS

[76] Inventor: Charles D. Foran, Jr., 2810 Ambleside La., Richardson, Tex. 75082

[21] Appl. No.: 541,957

[22] Filed: Jun. 22, 1990

[51] Int. Cl.⁵ .............................................. G01F 3/10
[52] U.S. Cl. ........................................ 73/253; 73/261; 418/102; 418/206
[58] Field of Search ...................... 73/253, 261, 861.87, 73/861.88, 861.91, 861.92; 384/123, 291; 418/102, 206

[56] References Cited

U.S. PATENT DOCUMENTS

| | | |
|---|---|---|
| 2,383,226 | 8/1945 | Swindle . |
| 2,710,540 | 6/1955 | Grote . |
| 2,775,209 | 12/1956 | Albright ........................ 418/102 X |
| 3,255,630 | 6/1966 | Karlby et al. . |
| 3,368,799 | 2/1968 | Sluijters ........................ 418/102 X |
| 3,457,835 | 7/1969 | Siebold . |
| 3,707,872 | 1/1973 | Masson et al. . |
| 4,579,008 | 4/1986 | Bohm et al. ...................... 73/261 X |
| 4,629,405 | 12/1986 | Hidasi et al. .................... 417/206 X |
| 4,648,281 | 3/1987 | Morita et al. .................... 73/861.91 |

*Primary Examiner*—Herbert Goldstein
*Attorney, Agent, or Firm*—James C. Wray

[57] ABSTRACT

A flowmeter has meshing rotors mounted on shafts. The bores of the rotors have plural longitudinally extending grooves which flow materials through the grooves and out of the bores to promote long, accurate running of the flowmeters. Radial faces of counterbores and end faces and lands of the rotor are provided with radial extensions of the axially extending grooves to provide flow of the material through the grooves.

19 Claims, 3 Drawing Sheets

FLOWMETERS HAVING ROTORS WITH GROOVED BORES AND LANDS

BACKGROUND OF THE INVENTION

Flowmeters measure fluid flow, primarily of liquids. Water meters are one example of flowmeters with which many people are familiar. Today, flowmeters are used in many manufacturing processes, including chemical a petroleum products blending and additive mixing, and in paints and foods.

Formulas used in such processes require high accuracy.

Traditionally, it has been thought that accuracy is improved by keeping clearances tight and measuring all of the fluid which flows through a flowmeter.

A problem exists in continuing the accuracies of flowmeters with products that may cause buildups in the flowmeters. When the flowmeters have been used with fluids containing solids, the solids build up in the flowmeter, resulting in friction and damage to the flowmeter and its parts or the product being measured. Occasionally flowmeters would seize, requiring delays in the process.

A need exists for improved flowmeters having improved flow measuring and long running characteristics, especially when used with fluids which may include solids or which may tend to build up residues in the flowmeters. The present invention seeks to solve that problem.

SUMMARY OF THE INVENTION

Surprisingly, it has been found that adding grooves to the rotor bores and bearing lands eliminates the problem of residue buildup and solids entrapment in spaces in the flowmeters. The grooves create a sweeping action that removes solids from the space between the shafts and the rotors. The solids are sent through the grooves to outside faces of the rotors and then out of the flowmeter. The grooves in the bearing lands help to remove any solids that are trapped between the bearing lands and the sides of the flowmeters.

The invention provides grooves in rotor bores and bearing lands, thereby eliminating the problem of solid buildup between the rotor shaft and rotor bore.

A flowmeter has meshing rotors mounted on shafts. The bores of the rotors have plural longitudinally extending grooves which flow materials through the grooves and out of the bores to promote long, accurate running of the flowmeters. Radial faces of counterbores and end faces and lands of the rotor are provided with radial extensions of the axially extending grooves to provide flow of the material through the grooves.

This invention provides a flowmeter having a housing, an inlet and an outlet connected to the housing, a cavity within the housing and the inlet and outlet communicating with the cavity, and at least one rotor in the cavity for rotating as fluid flows from the inlet to the outlet. A communicator associated with the rotor communicates movement of the rotor, which is related to the amount of material moving from the inlet to the outlet. The rotor has a central bore. Recessed axially extending grooves in the bore extend radially outward from the bore into the rotor.

The invention provides a flowmeter having at least one rotor for rotating in a cavity as fluid flows from an inlet to an outlet of the flowmeter. A communicator is associated with the rotor for communicating movement of the rotor, which is related to the amount of material moving from the inlet to the outlet. A central bore of the rotor has recessed axially extending grooves.

Preferably the grooves radially extend outward from the bore.

In a preferred embodiment, plural grooves are equally spaced circumferentially around the bore.

Preferably the grooves are equally deep and wide. In one embodiment, the grooves are rectangular.

In preferred embodiments, the grooves are from about 1/16" to about ⅛" wide and from about 1/16" to about ⅛" deep.

Preferably the grooves extend across the bore.

In preferred embodiments, terminal portions of the grooves extend radially outward along axially extending surfaces of the rotor.

A preferred rotor includes at least one relatively thin spacer land encircling the bore along one radially extending face of the rotor. Radially extending portions of the grooves extend radially and axially through the land.

In one embodiment, a counterbore is formed in the rotor. The counterbore has a generally radially extending internal face, and the grooves have terminal radial extensions which extend radially and axially through the radially extending face of the counterbore.

These and further and other objects and features of the invention are apparent in the disclosure, which includes the above and ongoing written specification, with the claims and the drawings.

DETAILED DESCRIPTION OF THE DRAWINGS

Figure 1:
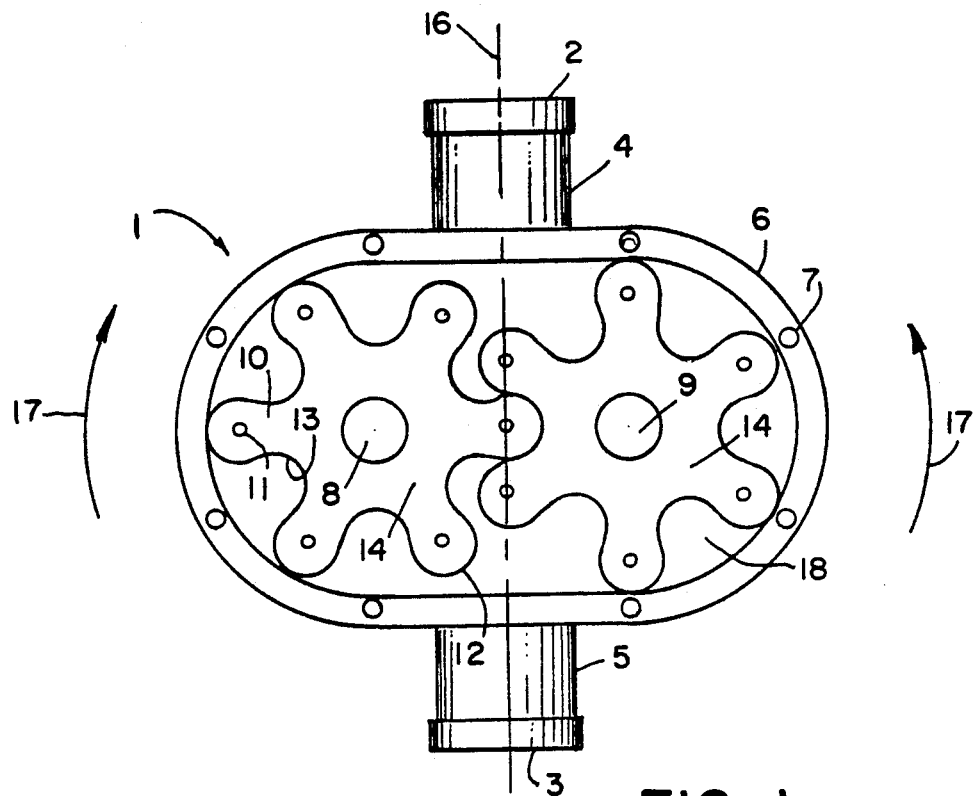
FIG. 1 schematically represents a flowmeter.

As shown in FIG. 1, a flowmeter previously made by the applicant and shown as prior art for understanding the invention is generally indicated by the numeral 1. The flowmeter has an outlet fitting 2 and an inlet fitting 3 which are respectively connected to outlet 4 and inlet 5, which communicate with the cavity within the housing 6. Fasteners 7 are used to hold a cover plate on the housing. Two shafts 8 and 9 are mounted in the housing for receiving two substantially identical rotors 14. In the lobes 10 of each rotor are mounted magnets 11, which signal the passage of the lobes to a pickup on the outer surface of the housing. Tips 12 of each lobe are spaced slightly from the valleys 13 so that when rotors 14 rotate the tips and valleys closely approach each other, as shown along the center line 16. As the rotors rotate in the directions of arrows 17, fluid is carried in the spaces 18 from the inlet 5 to the outlet 4. Since the volume of the spaces 18 are known, the flow rate is calculated by multiplying the number of volumes by the rotation of the rotors as measured usually from a single sensor along center line 16.

Figure 2:
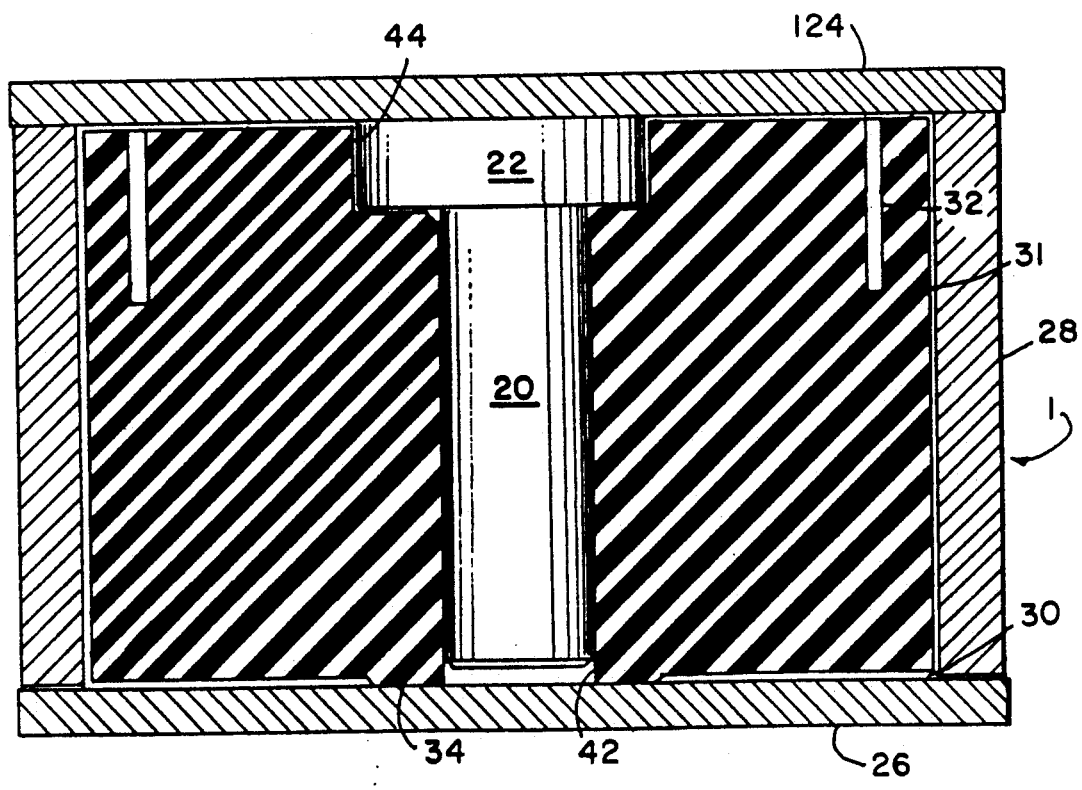
FIG. 2 is a cross-section of a flowmeter.

In one embodiment, as shown schematically in FIG. 2, shafts 20 have enlarged portions 22 which fit within counterbores. The shaft is cantilevered from plate 24 and is spaced from plate 26 which, with cylindrical wall 28, forms the housing. A space 30 is provided between the rotor 31 and the end plate 26. Magnets 32 are provided within recesses in the rotor. A land 34 on one end of the rotor offsets the rotor from plate 26 and provides the space 30.

Figure 3:
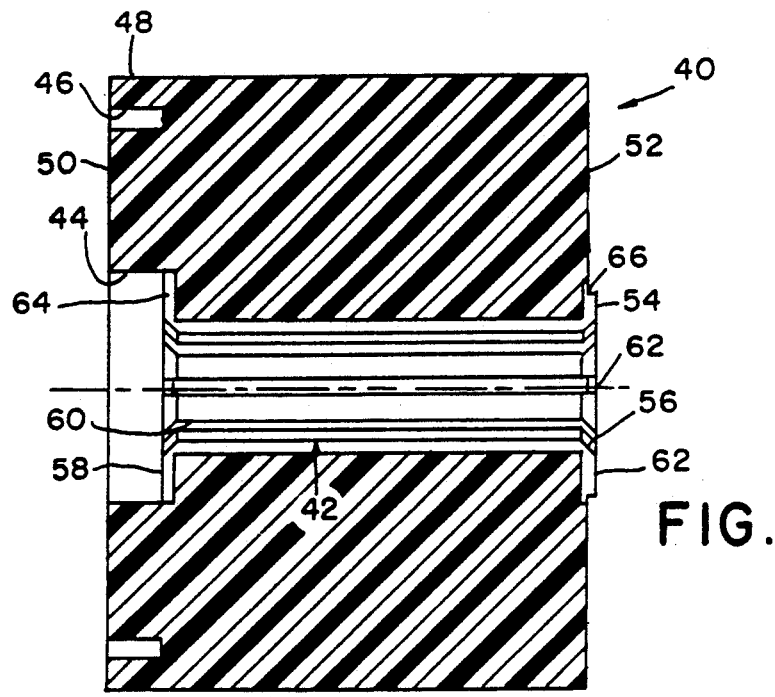
FIG. 3 is a cross-section of a flowmeter rotor showing grooves in the axial bore and in the axial faces of the counterbore and land at opposite axial ends of the rotor.
Figure 4:
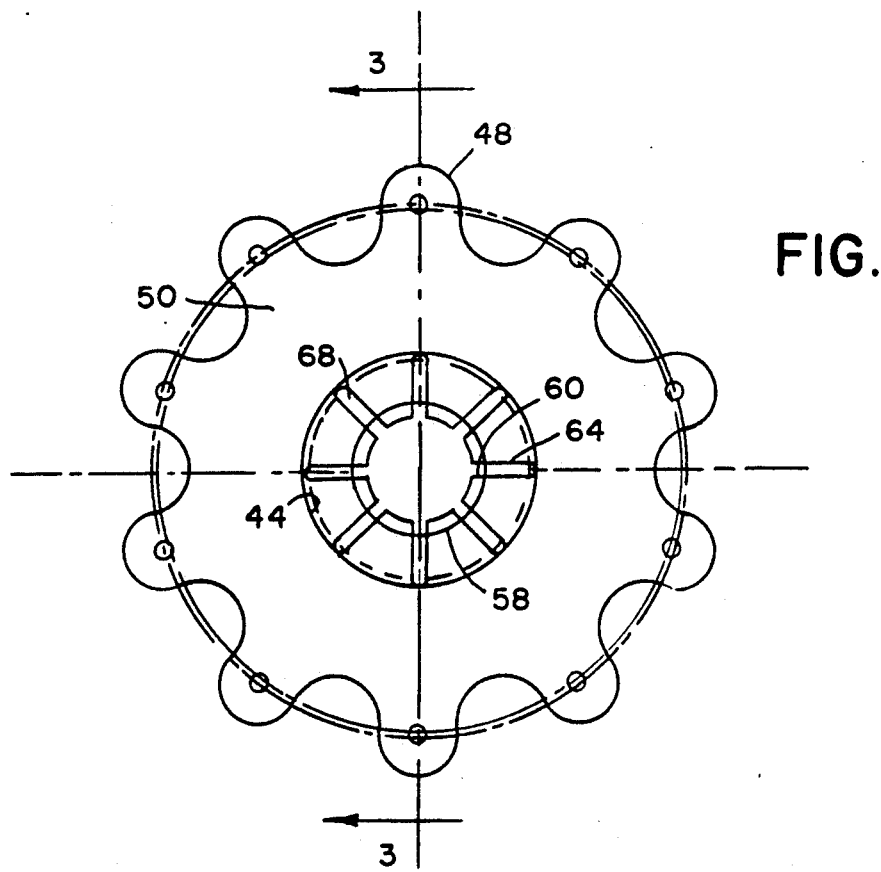
FIG. 4 is an elevation of the rotor shown in FIG. 3.

As shown in FIGS. 3 and 4, the rotor generally indicated by the numeral 40 for use with the shaft 20, as shown in FIG. 2, has a bore 42 and a counterbore 44. Openings 46 in lobes 48 hold magnets or other communicators such as, for example, light reflective devices which appear through transparent portions of the housing.

The counterbore 44 is in a first face 50 of the rotor. A second face 52 has an extended land 54 near the center of the rotor to provide a space from the end wall of the housing. In one embodiment of the invention, the tip dimension of the rotor may be about 5 ¾", and the land may have a 2" diameter and about a 0.015" thickness. Intersections 56 of land 54 and bore 42 are sloped or chamfered. Intersection 57 of radial wall 58 and bore 42 is similarly sloped or chamfered.

Grooves 60 extend axially through the bore 42 and terminal ends of the grooves have radial extensions 62 and 64. Radial extension 64 extend within the inner radial face 58 of counterbore 44, and opens into the counterbore space. Radial extensions 62 extend radially and axially outward through the land 54, and further extend 56 in curved openings in the radial wall 52 of the rotor 40.

As shown in FIG. 4, the radially extending grooves 64 terminate outwardly in curved surfaces 68 at the outward extension of the radial wall.

Figure 5:
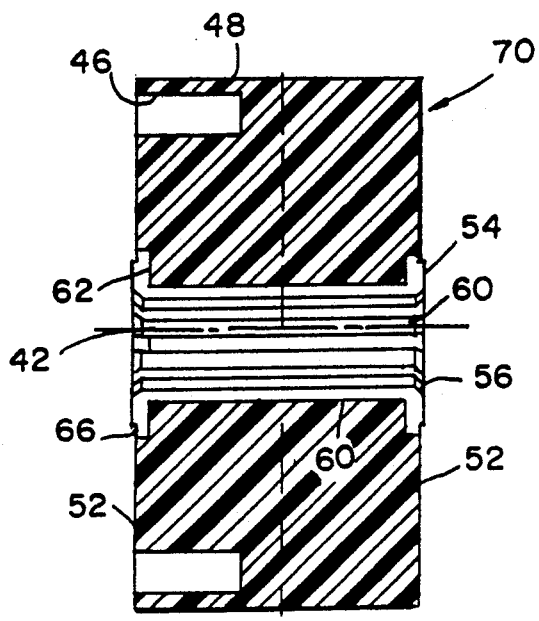
FIG. 5 is a cross-section of a rotor showing grooves extending axially through the bore.
Figure 6:
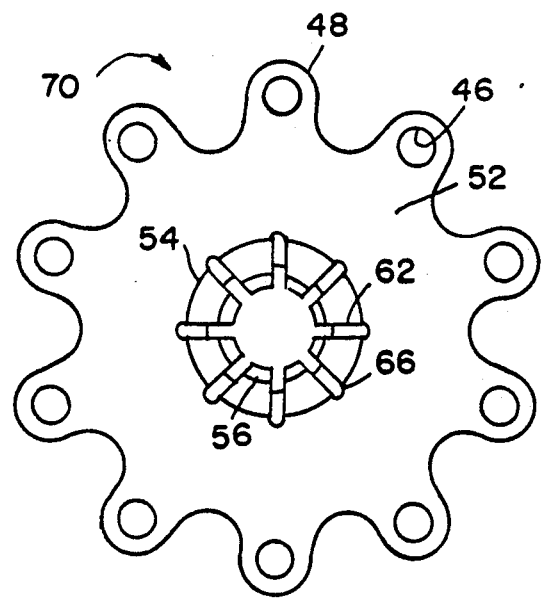
FIG. 6 is an elevation of the rotor shown in FIG. 5.

FIGS. 5 and 6 show a distinct rotor used in another embodiment of the flowmeter of the present invention. Rotor 70 has surfaces which are similar to the surfaces shown in rotor 40 in FIGS. 3 and 4, and similar surfaces have similar numbers. In rotor 70, two opposite faces 52 have lands 54 which contain the radial extensions 62 of the axial grooves 60. Rounded ends 66 extend into the face 52 of the rotor beyond the circumferential extension of the land 54, since the radial grooves 62 are deeper than the corresponding thickness of the lands 54. In the examples shown in FIGS. 5 and 6, the tip diameter of the rotor may be about 2.3", the diameters of the lands may be about ¾", and the diameter between the curved extensions 66 of the radially extending grooves 62 may be about 8/10". The bore may be about 0.38" and the grooves may be approximately 1/16" deep and 1/16" wide. A typical rotor such as shown in FIG. 6 has ten lobes and eight equally spaced grooves.

While the invention has been described with reference to specific embodiments, modifications and variations of the invention may be constructed without departing from the scope of the invention, which is defined in the following claims.

I claim:

1. A flowmeter having a housing, an inlet and an outlet connected to the housing, a cavity within the housing and the inlet and outlet communicating with the cavity, and at least one rotor in the cavity for rotating on a shaft as fluid flows from the inlet to the outlet, the rotor having first and second end walls, and a communicator associated with the rotor for communicating movement of the rotor which is related to the amount of material moving from the inlet to the outlet, the rotor having a central bore and having recessed into the rotor axially extending grooves in the bore and further the grooves radially extend outward from the bore at said end walls of the rotor.

2. The apparatus of claim 1, wherein plural grooves are equally spaced circumferentially around the bore.

3. The apparatus of claim 1, wherein the grooves are equally deep and wide.

4. The apparatus of claim 3, wherein the grooves are rectangular.

5. The apparatus of claim 4, wherein the grooves are from about 1/16" to about ⅛" wide and from about 1/16" to about ⅛" deep.

6. The apparatus of claim 1, wherein the grooves extend from the first end wall to the second end wall of the rotor through the bore.

7. The apparatus of claim 6, wherein terminal portions of the grooves extend radially outward along axially extending surfaces of the rotor.

8. The apparatus of claim 7, wherein the rotor comprises at least one relatively thin spacer land encircling the bore along one radially extending face of the rotor, and wherein the radially extending portions of the grooves extend radially through the land and axially through the land.

9. The apparatus of claim 1, wherein a counterbore is formed in the rotor and wherein the counterbore has a generally radially radial extensions which extend radially and axially through the radially extending face of the counterbore.

10. A flowmeter having at least one rotor for rotating on a shaft as fluid flows from an inlet to an outlet of a flowmeter, and a communicator associated with the rotor for communicating movement of the rotor which is related to the amount of material moving from the inlet to the outlet, the rotor having first and second end walls and further having a central bore and having recessed into the rotor axially extending grooves in the bore.

11. The apparatus of claim 10, wherein the grooves radially extend outward from the bore at said end walls of the rotor.

12. The apparatus of claim 10, wherein plural grooves are equally spaced circumferentially around the bore.

13. The apparatus of claim 10, wherein the grooves are equally deep and wide.

14. The apparatus of claim 13, wherein the grooves are rectangular.

15. The apparatus of claim 14, wherein the grooves are from about 1/16" to about ⅛" wide and from about 1/16" to about ⅛" deep.

16. The apparatus of claim 10, wherein the grooves extend from the first end wall to the second end wall of the rotor through the bore.

17. The apparatus of claim 16, wherein terminal portions of the grooves extend radially outward along axially extending surfaces of the rotor.

18. The apparatus of claim 17, wherein the rotor comprises at least one relatively thin spacer land encircling the bore along one radially extending face of the rotor, and wherein the radially extending portions of the grooves extend radially through the land and axially through the land.

19. The apparatus of claim 10, wherein a counterbore is formed in the rotor and wherein the counterbore has a generally radially extending internal face, and wherein the grooves have terminal radial extensions which extend radially and axially through the radially extending face of the counterbore.

* * * * *